United States Patent
Godin (10) Patent No.: US 9,346,410 B2
(45) Date of Patent: May 24, 2016

(54) UTILITY SPOILER

(71) Applicant: Gestion Bertrand Godin inc., Ste Marie Madeleine (CA)

(72) Inventor: Bertrand Godin, Ste-Marie-Madeleine (CA)

( * ) Notice: Subject to any disclaimer, the term of this patent is extended or adjusted under 35 U.S.C. 154(b) by 0 days.

(21) Appl. No.: 14/489,039

(22) Filed: Sep. 17, 2014

(65) Prior Publication Data

US 2015/0076858 A1 Mar. 19, 2015

Related U.S. Application Data

(60) Provisional application No. 61/880,112, filed on Sep. 19, 2013.

(51) Int. Cl.
| | | |
|---|---|---|
| *B60R 9/05* | (2006.01) | |
| *B60J 1/20* | (2006.01) | |
| *B62D 35/00* | (2006.01) | |

(52) U.S. Cl.
CPC .................. *B60R 9/05* (2013.01); *B60J 1/2088* (2013.01); *B62D 35/001* (2013.01)

(58) Field of Classification Search
CPC .......... B60R 9/04; B60R 9/0423; B60R 9/05; B62D 35/00; B62D 65/005
USPC ................. 224/405, 402; 296/180.1
See application file for complete search history.

(56) References Cited

U.S. PATENT DOCUMENTS

| | | | | | |
|---|---|---|---|---|---|
| 4,159,843 | A | * | 7/1979 | Crossman | 296/180.1 |
| D286,143 | S | * | 10/1986 | Lund | D12/181 |
| 4,867,497 | A | * | 9/1989 | Jayne | 296/3 |
| D305,017 | S | * | 12/1989 | Lund | D12/181 |
| 4,957,400 | A | * | 9/1990 | Karp | 410/110 |
| 4,984,837 | A | * | 1/1991 | Dise | 296/3 |
| 5,018,779 | A | | 5/1991 | Lund | |
| D326,078 | S | * | 5/1992 | Rogers | D12/181 |
| 6,315,327 | B1 | * | 11/2001 | Woolsey | 280/770 |
| 6,454,149 | B1 | * | 9/2002 | Moore | 224/405 |
| 2005/0093320 | A1 | * | 5/2005 | Brauer et al. | 296/3 |
| 2008/0030049 | A1 | * | 2/2008 | Cooper | 296/180.1 |
| 2011/0108590 | A1 | * | 5/2011 | Kennedy et al. | 224/402 |
| 2012/0181314 | A1 | * | 7/2012 | Moore | 224/402 |

OTHER PUBLICATIONS

"Super high MPG cars we may never see—p. 5—Fuelly Forums," printed Sep. 16, 2014 from http://www.fuelly.com/forums/showthread.php?p=173150.

(Continued)

*Primary Examiner* — Jason S Morrow (57) ABSTRACT

A spoiler for a vehicle, the vehicle having a cabin defining a cabin outer surface and a bed located behind the cabin, the spoiler being usable with an object, the spoiler comprising: a main portion and a utility portion extending from the main portion; the main portion being mountable to the cabin and defining substantially opposed main portion top and bottom surfaces; the utility portion being configured and sized for supporting at least part of the object; the main and utility portions being together configured and sized for deflecting air to reduce turbulence when the spoiler is operatively mounted to the cabin and the vehicle moves forward.

20 Claims, 4 Drawing Sheets

(56) References Cited

OTHER PUBLICATIONS

Extreme Dimensions, "Welcome to Extreme Dimensions :: Inventory Item :: 2009-2014 Dodge Ram 1500 Polyurethane . . . " printed printed Sep. 16, 2014 from http://extremedimensions.com/09-13-Ram-1500-U-Diablo-RW.html, the exact date of first public disclosure is unknown, but the applicant acknowledges that the product described in this printout was available in 2012, which is sufficiently earlier than the effective U.S. filing date that the particular month of first public use is not in issue.

* cited by examiner

UTILITY SPOILER

FIELD OF THE INVENTION

The present invention relates to automotive vehicles. More specifically, the present invention is concerned with a utility spoiler usable for example on the cabin of a pickup truck.

BACKGROUND

While popular for many years on cars, rear spoilers have become recently popular in more unconventional applications. For example, it is becoming more common to see spoilers secured to the cabin of pickup trucks. In addition to improving the aesthetics of the vehicle, the spoiler is often designed to reduce turbulence behind the vehicle, which in turn reduces fuel consumption.

One problem that occurs with spoilers mounted to the cabin of pickup trucks is that the spoiler reduces the utility of the truck in carrying long objects. Indeed, one manner of carrying an object longer than the bed of the pickup truck consists in positioning one end of the object at the rear end of the bed and abutting the object close to the front end on the cabin. However, spoilers are typically not manufactured to resist the forces that would be exerted thereon by such objects and could therefore be damaged should the above-described method be used.

In addition, to properly secure a flush mounted spoiler to the outer sheet metal of a vehicle, it is desirable that at least part of the bottom surface of the spoiler closely follows the curvature of the sheet metal. The bottom of the spoiler is generally rigid. Since different vehicles have different shapes, this therefore requires that a large inventory of different spoilers be kept, each one being adapted for a specific vehicle.

Accordingly, there is a need in the industry to provide an improved spoiler. An object of the present invention is therefore to provide such a spoiler.

SUMMARY OF THE INVENTION

In a broad aspect, the invention provides a spoiler for a vehicle, the vehicle having a cabin defining a cabin outer surface and a bed located behind the cabin, the spoiler being usable with an object, the spoiler comprising: a main portion and a utility portion extending from the main portion; the main portion being mountable to the cabin and defining substantially opposed main portion top and bottom surfaces; the utility portion being configured and sized for supporting at least part of the object; the main and utility portions being together configured and sized for deflecting air to reduce turbulence when the spoiler is operatively mounted to the cabin and the vehicle moves forward.

Advantageously, the spoiler, in addition to conventional aesthetic and aerodynamic functions, allows securing objects to the vehicle without damaging the surface finish of the cabin.

In another broad aspect, the invention provides a vehicle usable with an object, the vehicle comprising: a cabin defining a cabin outer surface and a bed located behind the cabin; and a spoiler mounted to the cabin outer surface, the spoiler including a main portion and a utility portion extending from the main portion; the main portion being mounted to the cabin and defining substantially opposed main portion top and bottom surfaces; the utility portion being configured and sized for supporting at least part of the object; the main and utility portions being together configured and sized for deflecting air to reduce turbulence.

In a variant, the spoiler extends along substantially the whole width of the cabin.

In yet another broad aspect, the invention provides a spoiler for a vehicle, the vehicle defining a vehicle outer surface, the spoiler comprising: a body mountable to the cabin and defining substantially opposed body top and bottom surfaces, the body bottom surface being substantially deformable so as to conform to a shape of the vehicle outer surface when the spoiler is surface mounted to the vehicle outer surface in an operational configuration to vehicle outer surfaces having different configurations.

In yet another broad aspect, the invention provides a method of attaching a spoiler to a vehicle, the vehicle defining a vehicle outer surface, the spoiler having a substantially deformable bottom surface, the method comprising: pressing the bottom surface against the cabin to deform the bottom surface from an unmounted configuration to a mounted configuration, the spoiler bottom surface having at least part thereof that deforms when passing from the unmounted configuration to the mounted configuration; and securing the spoiler to the vehicle with the bottom surface in the mounted configuration.

Other objects, advantages and features of the present invention will become more apparent upon reading of the following non-restrictive description of preferred embodiments thereof, given by way of example only and in relation with the following Figures.

BRIEF DESCRIPTION OF THE DRAWINGS

FIG. 2, in a perspective view, illustrates the spoiler shown in FIG. 1;

FIG. 3, in an alternative perspective view, illustrates the spoiler shown in FIGS. 1 and 2;

FIG. 8, in a perspective exploded view, illustrates the spoiler shown in FIG. 7;

FIG. 10, in a side cross-sectional view taken along section line X-X of FIG. 9, illustrates the spoiler shown in FIG. 9.

DETAILED DESCRIPTION

Figure 1:
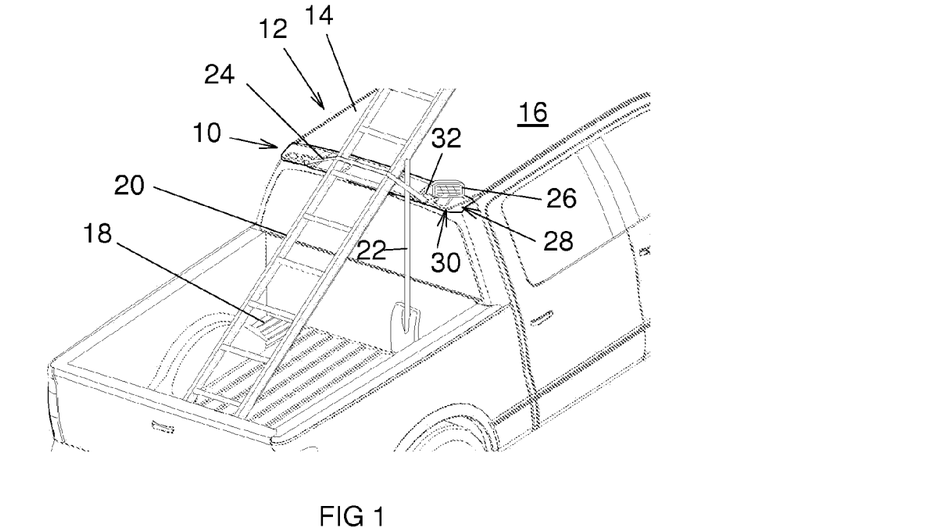
FIG. 1, in a partial perspective environmental view, illustrates a vehicle including a spoiler in accordance with an embodiment of the present invention.

Referring to FIG. 1, there is shown a spoiler 10 in accordance with an embodiment of the present invention, the spoiler 10 being mounted to a vehicle 12. The vehicle 12 has a cabin 14 defining a cabin outer surface 16 and a bed 18 located behind the cabin 14. The spoiler 10 is usable with one or more objects 20, 22, 24 and 26, here shown as a ladder 20, a shovel 22, a strap 24 and a lamp 26. Other objects, including non-limitingly sports equipment, antennas and rotating lights are also usable. The vehicle 12 typically includes conventional motor, wheels, steering and all the other conventional parts of a motorized vehicle 12 used on roads. These components are neither shown nor described in details as they are well-known in the art and do not interact with the spoiler in use, except for moving and operating the vehicle 12. Typically, but not exclusively, the spoiler 10 extends along substantially the whole width of the cabin 14. Also, in a typical but non-limiting embodiment, the spoiler 10 is mounted to the rear upper corner area of the cabin 14.

For the purpose of this document, the bed 18 is any open-top cargo area located behind the cabin 14. Examples of such beds 18 include the rear cargo area of pickup trucks and the rear cargo areas of flatbed trucks, among others. It should be noted that in some embodiments, temporary or removable covers may be fixed over the bed 18 without departing from the scope of the invention. It suffices that the vehicle 12 may achieve an operational configuration in which the rear cargo area is exposed from the top to the environment.

The spoiler 10 includes a main portion 28 and a utility portion 30 extending from the main portion 28. Typically, the main and utility portions 28 and 30 are together configured and sized for deflecting air to reduce turbulence when the spoiler 10 is operatively mounted to the cabin 14 and the vehicle 12 moves forward. The main portion 28 is mountable to the cabin 14. The utility portion 30 is configured and sized for supporting at least part of the object 20, 22, 24 and 26. In the specific example shown in FIG. 1, the ladder 20 has a first end thereof supported by the bed 18, at the rear end thereof, and abuts against the spoiler 10 at a location intermediate its opposed ends. The strap 24 is attached to two apertures 32 located on each side of the ladder 20 and described in further details hereinbelow. The ladder 20 is also inserted between the spoiler 10 and the strap 24 so that the strap 24 secures the ladder 20 to the spoiler 10. The lamp 26 is secured to the spoiler 10 through another aperture 32 and a shovel 22 is positioned vertical, along the cabin 14, and also inserted between the strap 24 and the spoiler 10. Therefore, the spoiler 10 partially support the ladder 20 and shovel 22 and completely supports the strap 24 and lamp 26. The above is only an example of the manner in which the spoiler 10 may be used and some of the objects 20, 22, 24 and 26 may be omitted. Also, other objects not described hereinbove may be used. Finally, the number of apertures 32 may vary and in some embodiments no aperture 32 is present.

The term "substantially" is used throughout this document to indicate variations in the thus qualified terms. These variations are variations that do not materially affect the manner in which the invention works and can be due, for example, to uncertainty in manufacturing processes or to small deviations from a nominal value that do not cause significant changes to the invention. These variations are to be interpreted from the point of view of the person skilled in the art. Also, directional terminology is used with reference to the position of the vehicle 12 when used in a conventional manner to go forward on a straight flat road. For example, "front" refers to the direction in which the vehicle 12 is moving, "bottom" refers to a direction towards the road supporting the vehicle 12, and lateral refers to a direction extending perpendicular to the front to rear direction.

Figures 2, 3:
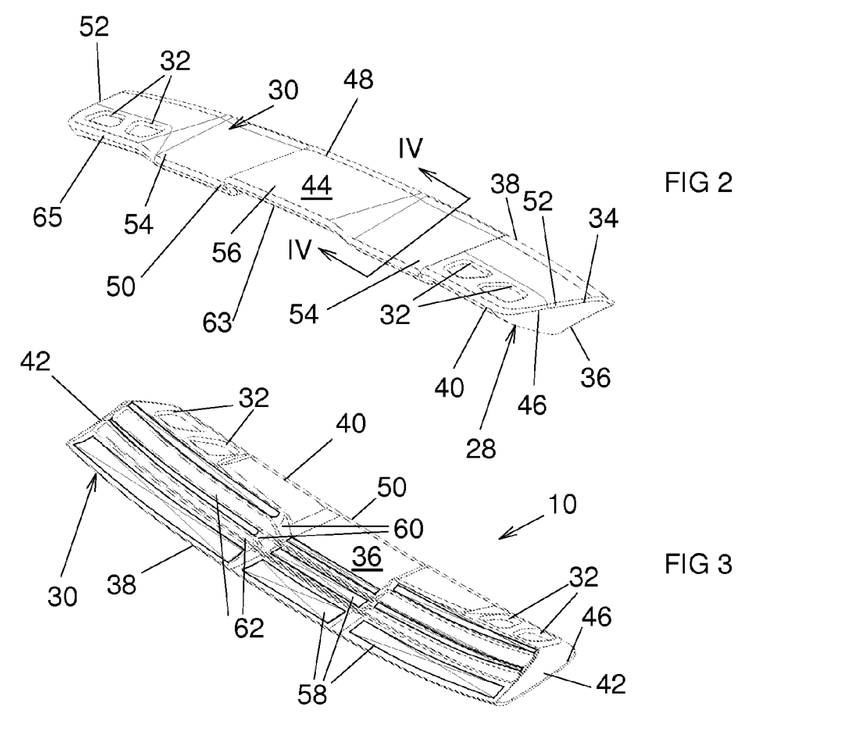

Referring to FIGS. 2 and 3 together, the main portion 28 defines substantially opposed main portion top and bottom surfaces 34 and 36. The main portion 28 also defines substantially opposed main portion front and rear edges 38 and 40 and substantially opposed main portion side edges 42 extending therebetween. Similarly, the utility portion 30 defines substantially opposed utility portion top and bottom surfaces 44 and 46. The utility portion 30 also defines substantially opposed utility portion front and rear edges 48 and 50 and substantially opposed utility portion side edges 52 extending therebetween.

Typically, the utility portion 30 covers at least part of the main portion top surface 34. For example, the utility portion 30 extends upwardly from the rear part of the main portion top surface 34. However, in alternative embodiments of the invention, the utility portion 30 is provided entirely at the rear of the main portion 28. Also, as better seen for example in FIG. 4, the main portion 28 defines a main portion rearwardmost location, here at the main portion rear edge 40, and the utility portion 30 covers the main portion rearwardmost location. Therefore, in these embodiments, the utility portion 30 covers the parts of the spoiler 10 that are most exposed to objects carried in the bed 18.

Typically, the main and utility portions 28 and 30 have different rigidities. Indeed, conventional spoilers are made to be relatively light, and therefore use relatively small amounts of materials, or materials having a small density. Accordingly they are often relatively fragile. In some embodiments, the utility portion 30 is more rigid than the main portion 28. Therefore, a relatively light spoiler 10 can be manufactured that can nevertheless maintain its integrity under the influence of external forces exerted by the objects 20, 22, 24 and 26. In addition, the relatively larger rigidity of the utility portion 30 helps in distributing over a larger area in the main portion 28 the localized forces exerted on the utility portion 30. In other embodiments, the utility portion 30 is less rigid than the main portion 28. In these embodiments, structural integrity is provided by the main portion 28, and the utility portion is softer to absorb shocks and vibrations.

Figure 4:
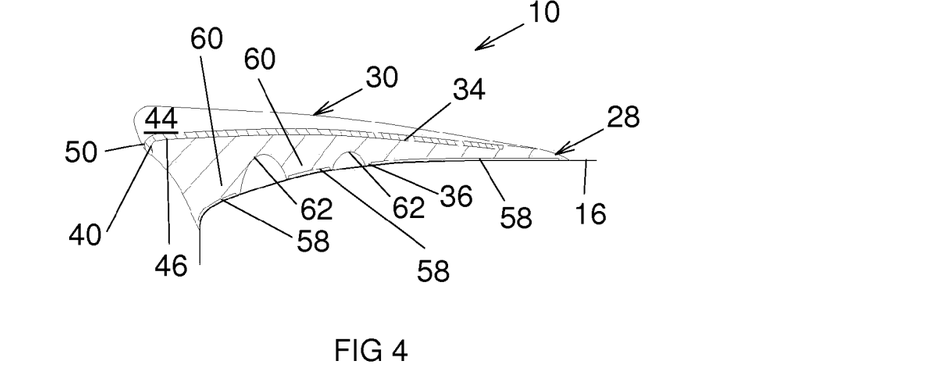
FIG. 4, in a side cross-section view along section line IV-IV of FIG. 2, illustrates the spoiler of FIGS. 1 to 3 mounted to a cabin having a first configuration.
Figure 5:
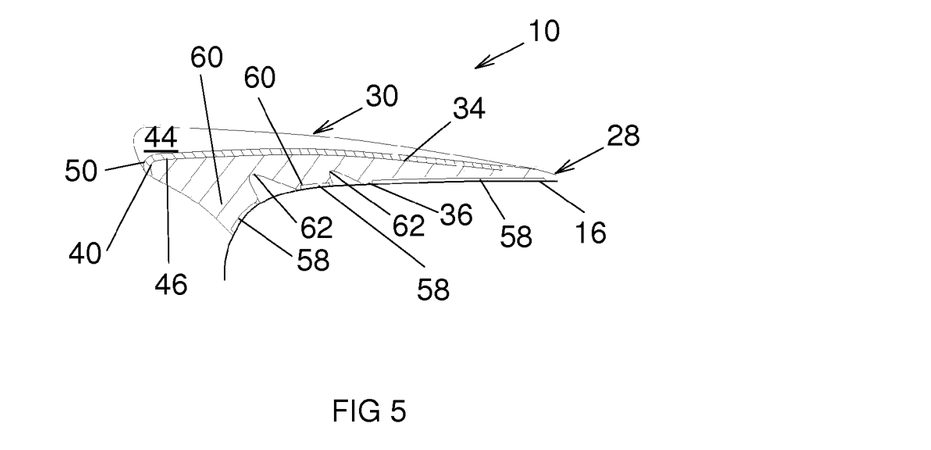
FIG. 5, in a side cross-section view along section line IV-IV of FIG. 2, illustrates the spoiler of FIGS. 1 to 4 mounted to a cabin having a second configuration.
Figure 6:
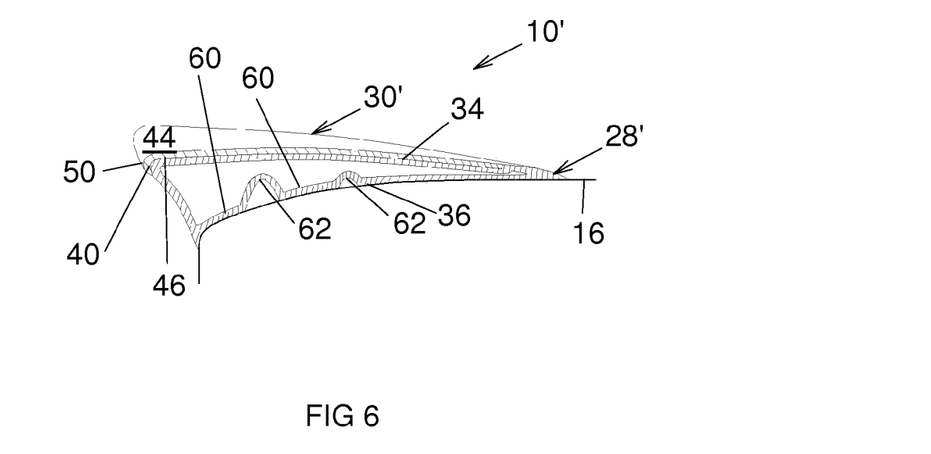
FIG. 6, in a side cross-section view, illustrates a spoiler in accordance with an alternative embodiment of the invention.

The differences in rigidity between the main and utility portions 28 and 30 may be caused by the use of different materials, the specific geometry the main and utility portions 28 and 30, or to both materials and geometry. An example of differences in geometry is illustrated in FIG. 6 in which a utility portion 30' of a spoiler 10' is made with bulk material, in other words the utility portion 30' is full, while the main portion 28' is made of a shell of material, in other words the main portion 28' if empty. FIGS. 4 and 5 show that in the spoiler 10, both the main and utility portions 28 and 30 are full, or in other words made of bulk material, but are instead made of different materials. Differences in geometry causing differences in rigidity may also be conveyed by differences in shape or dimensions.

In one specific embodiment of the invention, the main portion 28 is made of polypropylene and the utility portion 30 is made of rubber. In another specific embodiment of the invention, the main portion 28 is made of polyurethane and the utility portion 30 is made of polypropylene or polyethylene. Other combinations of materials are within the scope of the invention, such as those having the specific properties mentioned hereinabove. In yet other embodiments, the whole spoiler 10 is made of a single material.

In some embodiments of the invention, as better seen in FIG. 2, the utility portion 30 defines at least one upwardly open recess 54 for receiving at least part of some of the objects 20, 22, 24 and 26 thereinto. For example, the utility portion 30 defines a pair of upwardly open recesses 54 laterally spaced apart from each other by a central ridge 56. In the cases in which only one recess 54 is present, it may be laterally centered or laterally offset. Finally, more than 2 recesses 54 may be provided. The recesses 54 are used to laterally stabilize the object 20, 22, 24 and 26 received therein by restricting its lateral movements. In addition, in some embodiments, the recesses 54 also contribute to turbulence reduction.

The recesses 54 may either be formed only in the utility portion 30, or may also have a corresponding recessed structure in the main portion 28, below the recessed portion of the utility portion 30. In some embodiments of the invention, the recesses 54 are slanted so as to be deeper relative to adjacent portions of the utility portion 30 adjacent the utility portion rear edge 50 than adjacent the utility portion front edge 48 to better stabilize the objects supported therein, such as the ladder 20, while preserving good aerodynamic properties. However, in alternative embodiments, the recesses 54 have a uniform depth therealong.

As mentioned hereinabove, in some embodiments, the spoiler 10 defines at least one aperture 32 extending through the spoiler 10 in the utility portion 30. The aperture 32 serves as an object attachment for attaching some of the objects 20, 22, 24 and 26 thereto. In other embodiments, in addition to the apertures 32, or in replacement of the apertures 32, other object attachments are provided, for example in the form of hooks.

The aperture 32 therefore extends from the utility portion top surface 44 to the utility portion bottom surface 46. In some embodiments, the aperture 32 is entirely formed in the utility portion 30. In other embodiments, the aperture 32 is formed in the part of the spoiler 10 in which the main and utility portions 28 and 30 overlap. In these cases, the aperture 32 also extends through the main portion 28 so that the aperture 32 extends through the whole spoiler 10. The apertures 32 are usable to attach ropes, straps, bungee cords or similar devices to the spoiler 10. The apertures 32 are also usable to secure accessories, for example the lamp 26, to the spoiler 10 in any suitable manner. For example and non-limitingly, the accessory may be fitted to the aperture 32 or fastened to the spoiler 10 by using flat surfaces that abut against the spoiler 10 above and below the spoiler 10 and which are compressed toward each other using for example a nut and bolt combination, the bolt extending between the plates and through the aperture.

The spoiler 10 further comprises an attachment for securing the spoiler 10 to the cabin 14 so that the main portion bottom surface 36 abuts against the cabin outer surface 16. The spoiler 10 is typically flush mounted to the cabin 14, typically at the upper rear end thereof. To that effect, in an example, the attachment includes an adhesive provided on the main portion bottom surface 36. In a specific embodiment of the invention, the adhesive includes adhesive tape 58 secured to parts of the main portion bottom surface 36, as seen in FIGS. 3, 4 and 5. However, in alternative embodiments, the spoiler 10 is secured to the cabin 14 in any other suitable manner, for example using conventional nut and blot combinations or over-molded studs, among other possibilities. Also, in other alternative embodiments of the invention, at least part of the undersurface of the spoiler 10 is spaced apart from the cabin 14 by legs, posts or the like.

In some embodiments of the invention, the main portion bottom surface 36 is substantially rigid. In these embodiments, the spoiler 10 is manufactured so that at least part of the main portion bottom surface 36 conforms to the shape of the portion of the cabin 14 to which the spoiler 10 is to be mounted.

In other embodiments of the invention, at least part of the main portion bottom surface 36 is substantially deformable so as to conform to a shape of the cabin outer surface 16 when the spoiler 10 is surface mounted to the cabin outer surface 16 in an operational configuration for cabin outer surfaces 16 having different configurations, as seen from FIGS. 4 and 5. This may be achieved by having the main portion 28 made of a deformable material, such as a foam, or by having a main portion 28 made of a thin deformable shell. Therefore, in these embodiments, the same spoiler 10 is usable with vehicles 12 having different shapes. Deformable spoiler bottom surfaces are also usable in spoilers 10 that do not include a utility portion 30. In embodiments in which the utility portion 30 is present and in which the utility portion 30 is more rigid than the main portion 28, a synergy is created as the structure of the spoiler 10 then provides an efficient manner of transferring and distributing external punctual or highly localized loads first from the utility portion 30 to the main portion 28 due to the rigidity of the utility portion 30, and then from the main portion 28 to the vehicle 12 due to the potential for deformation of the main portion 28.

In some embodiments of the invention, as seen in FIG. 3, the main portion bottom surface 36 defines deformable ribs 60 separated from each other by recesses 62. The ribs 60 extend laterally along the spoiler 10, in other words from side to side. In addition to reducing the quantity of material required to manufacture the spoiler 10 when the main portion 28 is made of bulk material, the ribs 60 enhance the potential for deformation of the main portion bottom surface 36.

In some embodiments of the invention, the spoiler 10 also defines a bottom recess 63 extending from the bottom thereof, in register with the ridge 56. The bottom recess 63 is used for receiving a central brake light (not shown in the drawings) often present at the top of cabins 14.

In some embodiments of the invention in which the utility portion 30 is made of relatively rigid materials, the utility portion 30 is provided with a strip 65 of softer material, such as rubber, at the utility portion rear edge 50. However, in other embodiments of the invention, the strip 65 is omitted.

In use, the spoiler 10 is first secured to the vehicle 12. In embodiments including a deformable main portion bottom surface 36, this includes pressing the main portion bottom surface 36 against the cabin 14 to deform the main portion bottom surface 36 from an unmounted configuration to a mounted configuration, the main portion bottom surface 36 having at least part thereof that deforms when passing from the unmounted configuration to the mounted configuration, and securing the spoiler 10 to the vehicle 12 with the main portion bottom surface 36 in the mounted configuration. Then, the spoiler 10 can be used to support objects as shown in FIG. 1 for example.

Figure 7:
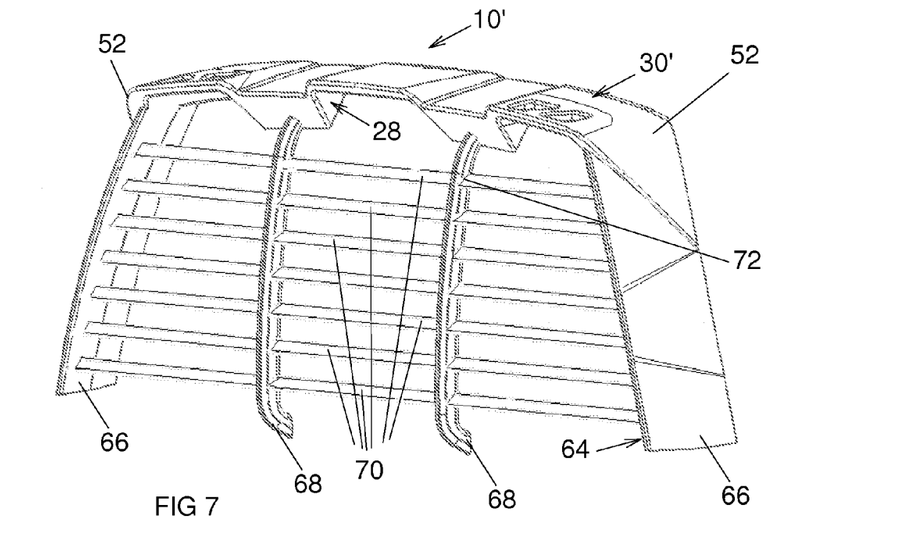
FIG. 7, in a perspective view, illustrates a spoiler in accordance with another alternative embodiment of the invention, the spoiler including a window protecting grille.
Figure 8:
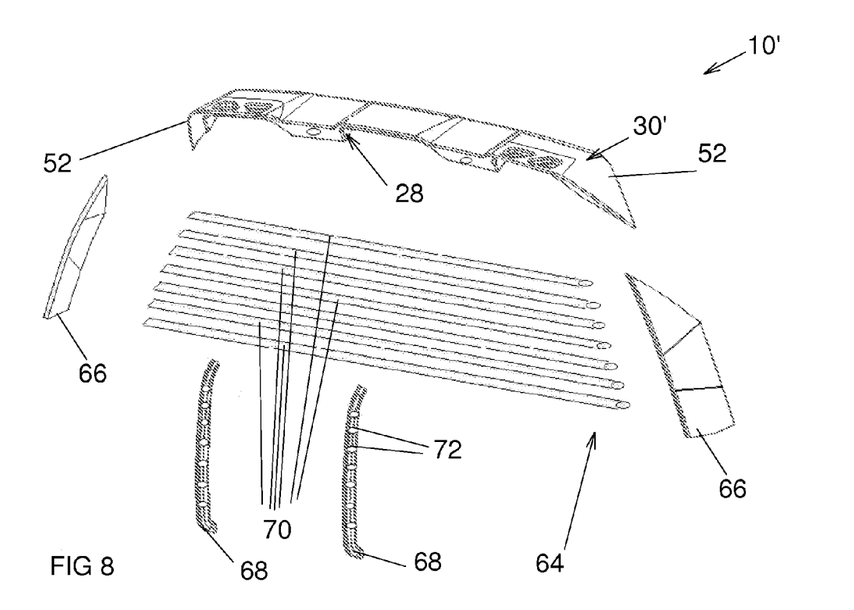

Referring to FIGS. 7 and 8, in an alternative embodiment of the invention, a spoiler 10" includes a grille 64 extending substantially downwardly from the utility portion 30" thereof. The grille 64 includes outer posts 66, inner posts 68 and horizontal bars 70. The outer and inner posts 66 and 68 are secured to the utility portion 30" in a substantially vertical configuration, for example using fasteners such and nuts and bolts, or an adhesive. The outer posts 66 are substantially adjacent the utility portion side edges 52. The inner posts 68 are laterally inwardly relative to the outer posts 66, for example in register with the recesses 54. The horizontal bars 70 are secured to the inner posts 68. For example, the inner posts 68 define through holes 72 through which the horizontal bars 70 extend. In some embodiments, the horizontal bars 70 are secured to the outer posts 66 in any suitable manner, for example using fasteners such as screw or bolts, an adhesive, or simply through recesses formed in the outer posts 66 in register with the horizontal bars 70 so that the horizontal bars 70 are constrained to remain at predetermined vertically fixed locations relative to the outer posts 66. In other embodiments, the horizontal bars 70 are not secured to the outer posts 66 and simply abut thereagainst. In some embodiments of the invention, the outer posts 66 and/or the inner posts 68 are also secured to the cabin 14, for example using bolts, screws or an adhesive. Typically, the horizontal bars 70 are maintained in a spaced apart relationship relative to the rear window of the cabin 14. The above-described structure of the grille 64 is only an example of grille 64 that is usable in the spoiler 10 and any conventional grille structure can be adapted to be usable with the spoiler 10. The grille 64 is typically configured to cover most or all of the rear window of the cabin 14 and may protect that window from shocks from objects and from the weather.

Figure 9:
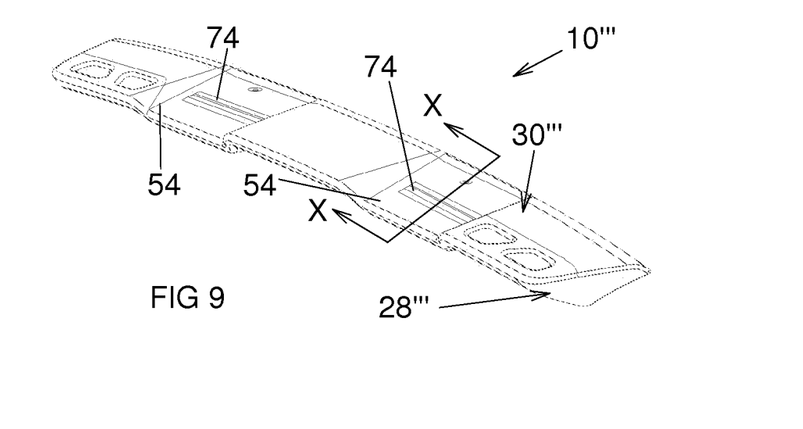
FIG. 9, in a perspective view, illustrates a spoiler in accordance with another alternative embodiment of the invention, the spoiler including a pair of tracks.

In yet another alternative embodiment, as seen in FIG. 9, a spoiler 10''' is provided with a track 74 extending laterally along at least part of the utility portion 30'''. In the embodiment of the invention shown in FIG. 9, two tracks 74 are provided, each in a respective one of the recesses 54, in register with the utility portion 30'''. However, only one or more than two tracks 74 may be present in alternative embodiments of the invention and such tracks may be positioned at any other suitable location. Each track 74 is configured for mounting complementarily shaped accessory mounts thereto, for example for slidably receiving thereinto conventional roof rack attachments. However, in alternative embodiments of the invention, the tracks 74 have any any other suitable shapes that may slidably receive another object thereonto.

Figure 10:
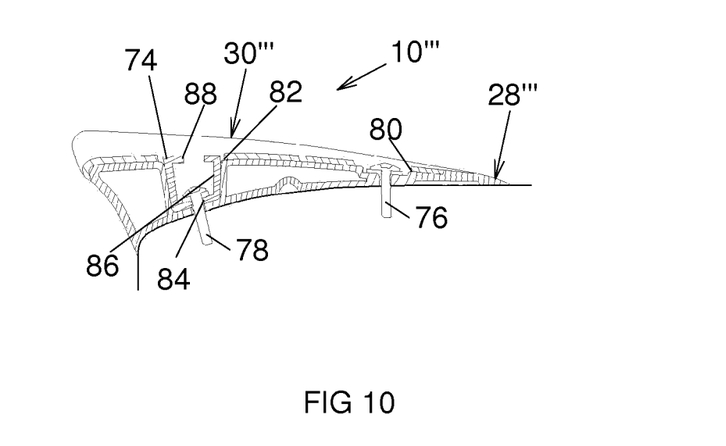

As seen in FIG. 10, another difference between the spoiler 10''' and the spoilers 10, 10' and 10" described hereinabove resides in that the spoiler 10''' is secured to the cabin 74 using screws 76 and 78 that extend through suitable shaped apertures 80 and 82 provided in the spoiler 10'''. The screw 78 also extends through an aperture 84 provide in the track 74 in register with the aperture 82.

The track 74 has in the specific embodiment shown in the drawings a substantially elongated rectilinear configuration with a substantially C-shaped cross-section in a plane transverse to the track 74 and thus defines a cavity 86 and a slit 88 leading thereinto from the top surface of the spoiler 10'''.

Although the present invention has been described hereinabove by way of preferred embodiments thereof, it can be modified, without departing from the spirit and nature of the subject invention as defined in the appended claims.

What is claimed is:

1. A spoiler for a vehicle, said vehicle having a cabin defining a cabin outer surface and a bed located behind said cabin, said spoiler being usable with an object, said spoiler comprising:
   a main portion and a utility portion extending from said main portion;
   said main portion being mountable to said cabin and defining substantially opposed main portion top and bottom surfaces;
   said utility portion being configured and sized for supporting at least part of said object;
   said main and utility portions being together configured and sized for deflecting air to reduce turbulence when said spoiler is operatively mounted to said cabin and said vehicle moves forward;
   said main portion being configured and sized so that said spoiler is flush mounted to said cabin when operatively mounted thereto with at least part of said main portion bottom surface abutting against said cabin outer surface and fixedly attached thereto.

2. A spoiler as defined in claim 1, wherein said utility portion is less rigid than said main portion.

3. A spoiler as defined in claim 1, wherein said utility portion is more rigid than said main portion.

4. A spoiler as defined in claim 1, wherein said main and utility portions are made of different materials.

5. A spoiler as defined in claim 1, wherein said utility portion covers at least part of said main portion top surface.

6. A spoiler as defined in claim 5, wherein said main portion defines a main portion rearwardmost location, said utility portion covering said main portion rearwardmost location.

7. A spoiler as defined in claim 1, wherein said utility portion defines an upwardly open recess for receiving at least part of said object thereinto.

8. A spoiler as defined in claim 7, wherein said utility portion defines substantially opposed utility portions front and rear edges, said recess being slanted so as to be deeper relative to adjacent portions of said utility portion adjacent said utility portion rear edge than adjacent said utility portion front edge.

9. A spoiler as defined in claim 7, wherein said utility portion defines a pair of upwardly open recesses laterally spaced apart from each other by a central ridge.

10. A spoiler as defined in claim 1, wherein said spoiler defines at least one object attachment for securing said object thereto.

11. A spoiler as defined in claim 10, wherein said object attachment includes at least one aperture extending through said spoiler in said utility portion.

12. A spoiler as defined in claim 1, wherein said main portion bottom surface is substantially rigid, said spoiler further comprising an attachment for securing said spoiler to said cabin so that said main portion bottom surface abuts against said cabin outer surface.

13. A spoiler as defined in claim 1, wherein at least part of said main portion bottom surface is substantially deformable so as to conform to a shape of said cabin outer surface when said spoiler is surface mounted to said cabin outer surface in an operational configuration for cabin outer surfaces having different configurations.

14. A spoiler as defined in claim 13, wherein said main portion bottom surface defines recesses extending in said main portion, said recesses defining deformable ribs therebetween.

15. A spoiler as defined in claim 13, further comprising an adhesive provided on said main portion bottom surface.

16. A spoiler as defined in claim 1, further comprising a grille extending substantially downwardly from said utility portion.

17. A spoiler as defined in claim 1, wherein said spoiler extends along substantially the whole width of said cabin when operationally mounted to said vehicle.

18. A spoiler as defined in claim 1, wherein said utility portion defines a utility portion rear edge, said utility portion being provided with a strip of a material softer than the remainder of said utility portion at said utility portion rear edge.

19. A spoiler as defined in claim 1, wherein said utility portion defines a laterally extending track for mounting complementarily shaped accessory mounts thereto.

20. A vehicle usable with an object, said vehicle comprising:
   a cabin defining a cabin outer surface and a bed located behind said cabin; and
   a spoiler mounted to said cabin outer surface, said spoiler including a main portion and a utility portion extending from said main portion, said main portion being mounted to said cabin and defining substantially opposed main portion top and bottom surfaces, said utility portion being configured and sized for supporting at least part of said object, and said main and utility portions being together configured and sized for deflecting air to reduce turbulence, said spoiler extending along substantially the whole width of said cabin;

wherein said spoiler is flush mounted to said cabin with at least part of said main portion bottom surface abutting against said cabin outer surface and fixedly attached thereto.

\* \* \* \* \*